United States Patent [19]

Wilkens

[11] Patent Number: 4,671,060
[45] Date of Patent: Jun. 9, 1987

[54] EXPLOSION-PROTECTED DIESEL ENGINE

[76] Inventor: Robert G. Wilkens, Aschenputtelweg 23, D-5600 Wuppertal 2, Fed. Rep. of Germany

[21] Appl. No.: 757,619

[22] Filed: Jul. 22, 1985

Related U.S. Application Data

[63] Continuation-in-part of Ser. No. 587,187, Mar. 7, 1984, abandoned.

[51] Int. Cl.⁴ .............................. F01N 3/02; F01N 3/06
[52] U.S. Cl. ........................................ 60/319; 48/192; 60/311; 60/316
[58] Field of Search ............... 60/316, 319, 308, 311; 48/192

[56] References Cited

U.S. PATENT DOCUMENTS

| 1,864,915 | 6/1932 | Kosterman | 60/316 |
| 2,772,537 | 12/1956 | Lisciani | 60/311 |
| 3,018,841 | 1/1962 | Gerlich | 60/311 |
| 3,079,242 | 2/1963 | Glasgow | 48/192 |
| 3,535,066 | 10/1970 | Wagner | 48/192 |

FOREIGN PATENT DOCUMENTS

| 803980 | 7/1936 | France | 60/316 |
| 2093119 | 8/1982 | United Kingdom | 60/311 |

Primary Examiner—Douglas Hart
Attorney, Agent, or Firm—Karl F. Ross; Herbert Dubno

[57] ABSTRACT

A diesel engine has a fresh-air intake, an exhaust-gas output, and a cooling system in which a liquid coolant is circulated. This system is provided with an antiexplosion system having an intake flame arrester in the intake and a jacketed exhaust-pipe section connected to the output and receiving exhaust gases therethrough from the engine. The cooling system is connected to the jacketed exhaust-pipe section to cool same and to cool the exhaust gases therein by indirect heat exchange with the coolant. An exhaust-gas heat exchanger is connected through the jacketed pipe section to the output. The cooling system is also connected to the heat exchanger to cool the exhaust gases therein by indirect heat exchange with the coolant. An output flame arrester is connected via another exhaust-pipe section to the heat exchanger for conducting cooled exhaust gas from the exchanger to the arrester. Both of the flame arresters have an arrester housing and at least one plate therein defining a multiplicity of parallel passages of very small flow cross section and a similar output flame arrester. In addition the system has a venturi-type exhaust-gas diluter downstream of the output flame arrester for mixing the cooled exhaust gas with ambient air.

1 Claim, 9 Drawing Figures

EXPLOSION-PROTECTED DIESEL ENGINE

CROSS REFERENCE TO RELATED APPLICATION

This application is a continuation-in-part of application No. 587,187 filed Mar. 7, 1984 (now abandoned).

FIELD OF THE INVENTION

The present invention relates to a diesel engine. More particularly this invention concerns such an engine which is specifically set up so as to be protected from causing an explosion so it can be used in a mine or the like.

BACKGROUND OF THE INVENTION

When a diesel engine is used in a mine, either on a railed vehicle, suspended monorail, or for a standard tractor, loader, or when it is used in close proximity to people and to explosive gases and the like, it is necessary to provide it with certain safety features. The exhaust gases must normally be cooled considerably, to at most about 70° C., before being released to the surrounding air. Furthermore in a mine it is essential to avoid the ignition of surrounding explosive gases, either by sucking them into the engine intake and having them flash back or by igniting them directly with the engine exhaust. Although a properly tuned diesel engine will generate minimal pollutants except for easy-to-filter particulates, it is extremely difficult to dissipate the large amount of heat generated in such a high-compression machine.

In British Pat. Nos. 549,398 filed July 23, 1942 by A. Flatt and 670,732 filed June 23, 1950 by F. Staddon plate-type flame arresters are described which each have a stack of plates that form a plurality of relatively circuitous passages of a width of about 0.8 mm, which is large enough to pass particulate matter without clogging. Any spark or flame in the gas passing through such a device, whether going into the intake manifold of the engine or coming from the exhaust manifold thereof, will be cooled and quenched.

British Pat. No. 903,493 filed May 1, 1961 by D. Brown describes an exhaust pipe which is jacketed so that a liquid coolant can flow through it to cool the exhaust gases therein. In addition some of water is sprayed directly into the flow of exhaust gas to scrub and cool it. The thus cooled gases are then passed through a flame arrester and mixed with ambient air prior to discharge to the atmosphere. Thus the temperature of the exhaust gases is reduced greatly and any harmful constituents of the gas are eliminated and/or attenuated. Another such jacketed exhaust pipe is described in British Pat. No. 1,303,336 filed Sept. 17, 1971 by N. Parfitt.

The system of British Pat. No. 1,037,339 filed Aug. 27, 1964 by H. Hammitzsch et al aims at reducing water consumption in a system such as described immediately above by cooling the exhaust gases wholly by indirect heat exchange. To this end the exhaust gases pass meander-fashion through a succession of individual tube assemblies enclosed in a housing filled with a liquid coolant. By the time the gas has traversed all these tube assemblies its temperature is reduced to a safe level. In addition the tube assemblies are set up with manifolds of large flow cross section to strip particles from the gas stream being cooled.

A complex cooling and control system is described in British Pat. No. 1,246,888 filed May 12, 1969 by Envirotech Corporation. This arrangement employs the latent heat of evaporation of water that is injected into the exiting exhaust-gas stream to cool it. The flow of water to the injectors is controlled in accordance with various engine operating parameters. Similarly U.S. Pat. No. 3,621,652 filed July 2, 1970 by J. Demaree passes the exhaust gases through a pair of chambers. In the first the gas gives up heat and in the second it is cooled directly by spraying water into it. Thus the cooling effect in the second chamber is applied to the upstream gases.

In U.S. Pat. No. 3,831,377 filed July 24, 1972 by A. Morin a separate radiator and coolant circuit is used to chill the exhaust gases so much that many harmful constituents are condensed out of them. In addition the lighter volatile phase is separated out and fed back to the intake manifold.

All of these systems are relatively complex. In addition few of them reliably provide the level of explosion protection needed on a diesel engine used in a mine or other dangerous location.

In my above-cited copending patent application I further describe a diesel engine having a fresh-air intake, an exhaust-gas output, and a cooling system in which a liquid coolant is circulated. This system is provided with an antiexplosion system having an intake flame arrester in the intake and a jacketed exhaust-pipe section connected to the output and receiving exhaust gases therethrough from the engine. The cooling system is connected to the jacketed exhaust-pipe section to cool same and to cool the exhaust gases therein by indirect heat exchange with the coolant. An exhaust-gas heat exchanger is connected through the jacketed pipe section to the output. The cooling system is also connected to the heat exchanger to cool the exhaust gases therein by indirect heat exchange with the coolant. An output flame arrester is connected via another exhaust-pipe section to the heat exchanger for conducting cooled exhaust gas from the exchanger to the arrester.

With such an arrangement the exhaust-gas cooling is integrated with the engine, and there is no need for a continually replenished external water supply. The mess made by engines where water is injected right into the exhaust gases is completely eliminated. In addition the pressure-related problems of the water-injection systems are completely avoided as well of course as the necessity of providing for a mobile water supply either connected to or mounted on the vehicle incorporating the engine system.

This arrangement, which is also generally described in British Pat. No. 2,093,119, functions well, but is susceptible of refinement.

OBJECTS OF THE INVENTION

It is therefore an object of the present invention to provide an improved explosion-proof diesel engine system.

Another object is the provision of such an improved explosion-proof diesel engine system which overcomes the above-given disadvantages, that is which refine and add to the principles described in my above-cited copending application.

SUMMARY OF THE INVENTION

The system of this invention corresponds generally to that described above, but is provided with an intake flame arrester in the intake and having an arrester housing and at least one plate therein defining a multiplicity of parallel passages of very small flow cross section and a similar output flame arrester. In addition it has a venturi-type exhaust-gas diluter downstream of the output flame arrester for mixing the cooled exhaust gas with ambient air.

This combination of features ensures extremely good protection against explosion. Not only is flame absolutely prevented from entering and leaving the system, but the exiting exhaust gas is cooled so much that explosion is completely ruled out.

In accordance with another feature of this invention each arrester housing is of substantially greater flow cross section than the respective intake and output and the passages of the arresters measure at most 1.0 mm across. The plates of the arresters, which may be provided in several sets for extremely effective flame suppression, are of corrugated sheet metal with all the corrugations parallel to the throughflow direction. These plates are bunched up and held in replaceable cores in the housings.

The diluter according to this invention includes a large-diameter outer tube centered on an upstream-to-downstream axis and having upstream and downstream ends open to the atmosphere, and a nozzle-type core in the outer tube and forming a plurality of gaps opening radially outward and downstream in the outer tube. Such a diluter has an output that is a low-velocity stream of gases virtually at ambient temperature.

DESCRIPTION OF THE DRAWING

The above and other features and advantages will become more readily apparent from the following, reference being made to the accompanying drawing in which:

FIG. 1a is a detail view illustrating a variant on the inventive system intended for use on vehicles or machines;

Specific Description

Figure 1:
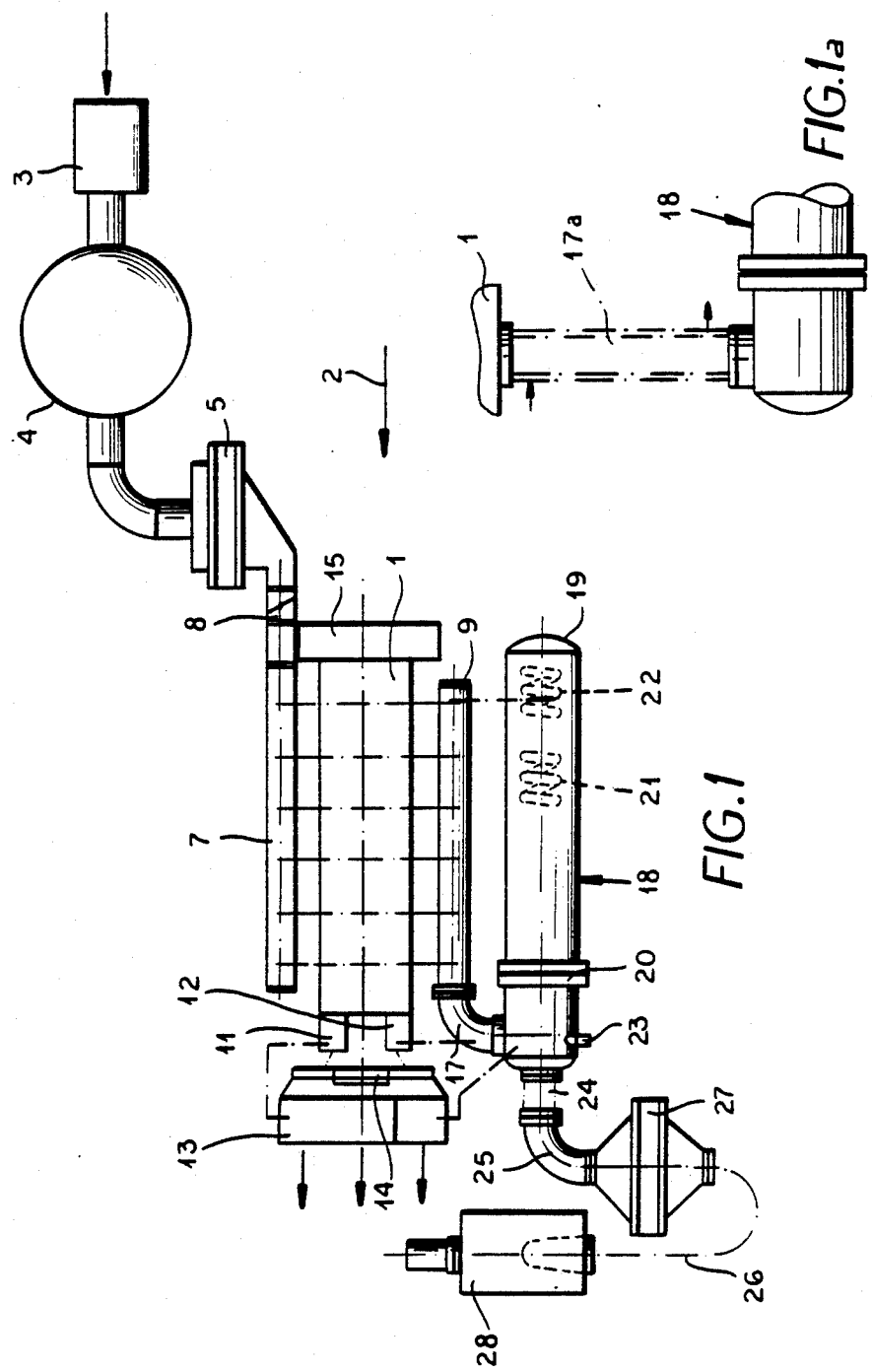
FIG. 1 is a largely schematic illustration of the system of this invention.

As seen in FIG. 1 a drive system 2 for a mine tractor or the like has a six-cylinder diesel engine 1 having an intake manifold 7 and an exhaust manifold 9 mounted as is standard. At its rear end the engine 1 has a flywheel 15 and at its front end is fitted with a two-part radiator 13 having a fan 14.

The intake 7 is connected through an angle-type rotary or flap-type valve 8 to a plate-type flame arrester 5 and therethrough to a filter 4 which receives ambient air through a dust screen 3. The arrester 5 prevents any flammable gas from being sucked into the engine 1 and then exploding and flashing back in the opposite direction.

The exhaust manifold 9 is connected through a jacketed or double-wall elbow 17 to a heat exchanger 18. Both this elbow 17, which forms part of the exhaust pipe of the engine 1, and the exchanger 18 are traversed in a closed circuit by a liquid coolant circulated by a pump 12 through them and through a separate and independent portion of the radiator 13. Another such pump 11 is provided that circulates a liquid coolant through another portion of the radiator 13 and through the engine 1. The portion of the radiator dedicated to the engine 1 is larger as indicated in FIG. 1 than that portion used for cooling the exhaust gases. As indicated in FIG. 1a a straight jacketed conduit or compensator 17a can replace the elbow 17.

The heat exchanger 18 has a cylindrical housing part 19 closed at one end and releasably secured at its other end to a flange 20 so it can be removed. Internally it has tube bundles 21 and 22 through which the exhaust gases pass, and around which the liquid coolant flows. A temperature sensor 23 forming part of an engine-control system is connected to the downstream end of the heat exchanger 18 to shut down the engine and close the valve 8 if the temperature at this region exceeds about 150° C.

The downstream end of the exchanger 18 is connected via a compensator or conduit 24 to an input elbow 25 of a flame arrester 27 and thence through another conduit 26 to a gas-diluting muffler 28. The conduits 24 and 26 can be of any convenient shape or length, as by the time the exhaust gases reach them they are relatively cool, that is under 150° C., so that the arrester 27 and muffler 28 can be mounted at any convenient location on the tractor or vehicle having the engine 1.

Figure 2:
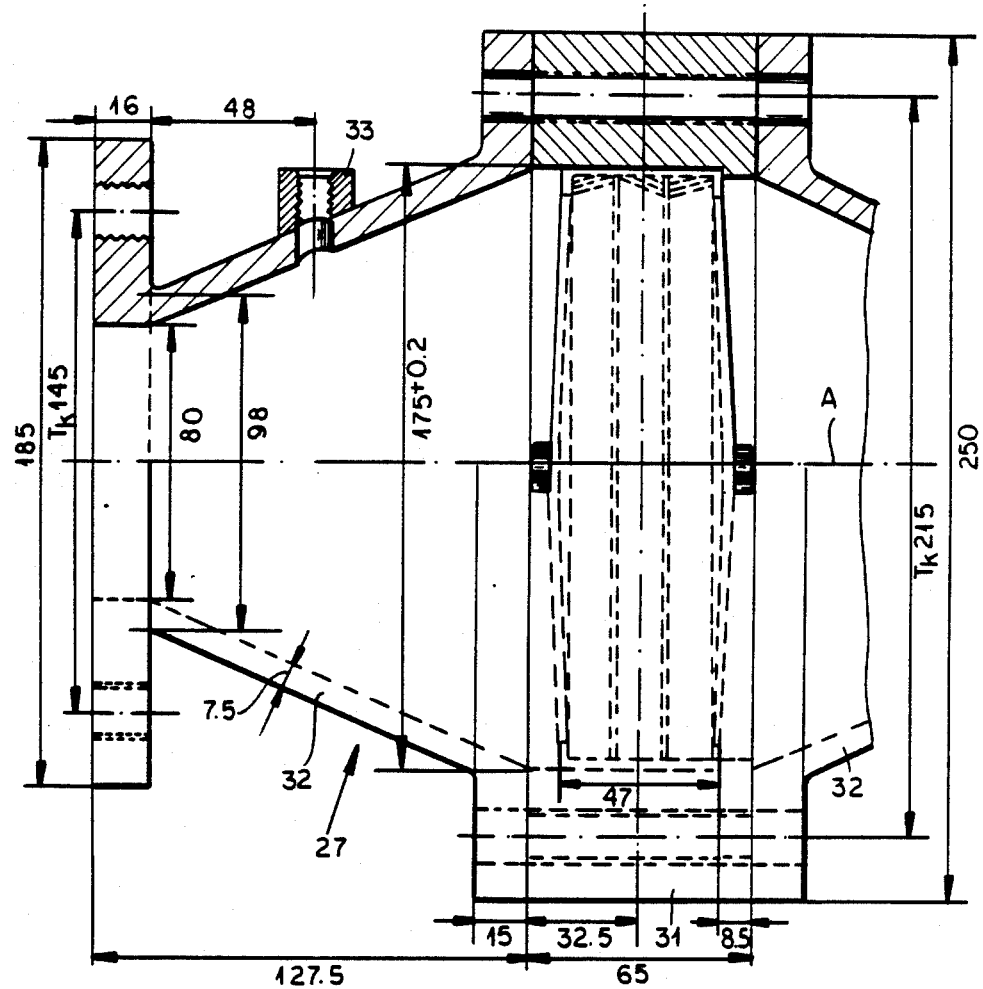
FIG. 2 is a large-scale section through one of the flame arresters of FIG. 1.
Figure 3:
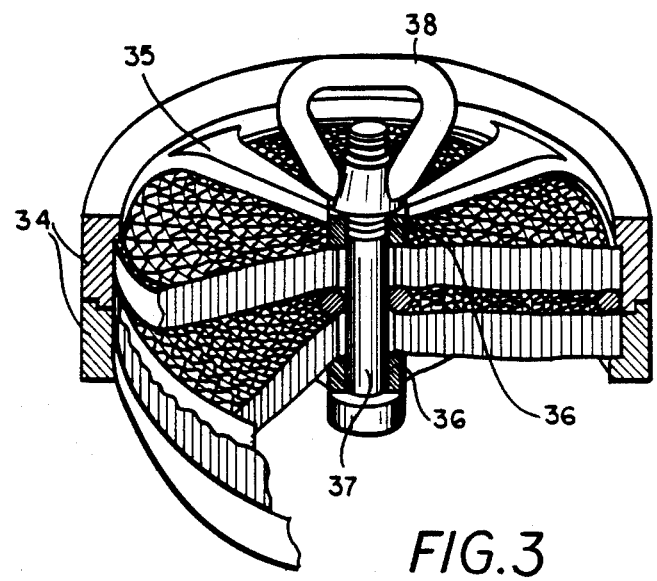
FIG. 3 is a partly broken-away perspective view of the core of the flame arrester shown in FIG. 2.
Figure 4:
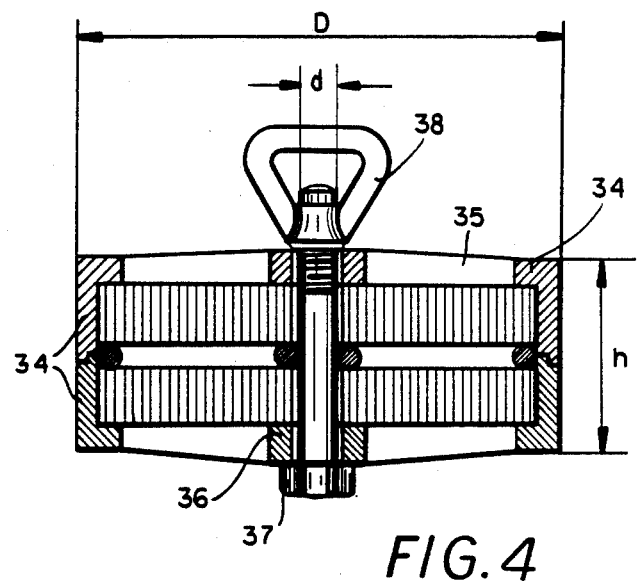
FIG. 4 is an axial section through the core of FIG. 3.

As shown in FIGS. 2, 3 and 4 the plate-type flame or spark arrester 27, which is identical to the arrester 5, has a pair of identical housing portions 32 between which two sets of plates 30 is held in an annular core housing part 31. A fitting 33 is provided for mounting a temperature and/or pressure sensor that is also connected to the engine control system. Such an assembly can be very compact.

The plates 30 are formed of very thin and corrugated steel sheeting that is wound up to form a filter of fairly small mesh size of typically 0.7 mm. To the cross-sectional area occupied by these plates 30, the housing is of substantially greater flow cross section at them than upstream and downstream, so that the flame arrester does not constitute a flow restriction that would increase pressure.

Furthermore as shown in FIGS. 3 and 4 the plates 30 are held in two separate layers between rings 34 formed with spokes 35 and hubs 36. A bolt 37 passes axially through the two hubs 36 and through the two plates 30 so as to hold the assembly together, with a nut 38 holding the unit together. Thus the two housing halves 32 can be unbolted to allow replacement of this core.

Figure 7:
FIGS. 7 and 8 are large-scale side and top views of a detail of the flame arrester of FIGS. 3 and 4.
Figure 8:
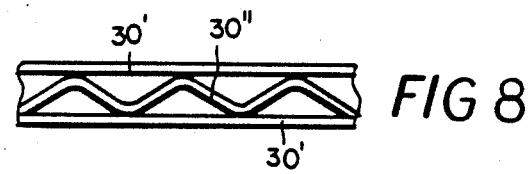

These plates 30 as seen in FIGS. 7 and 8 include generally straight edge plates 30' and a zig-zag plate 30" between them. The spacing between adjacent undulations is 2 mm and the perpendicular spacing between the plates is 0.7 mm. The plates 30' and 30" have a thickness of 0.15 mm and they are angled at 75° to their general plane.

The operation of the flame arrester is simple: The small mesh size combined with the considerable heat capacity of the plates 30 kills any flame by reducing its temperature very rapidly. Such an arrester prevents any flame from shooting out of the system, and similarly prevents any local flame from being sucked into it.

Figure 5:
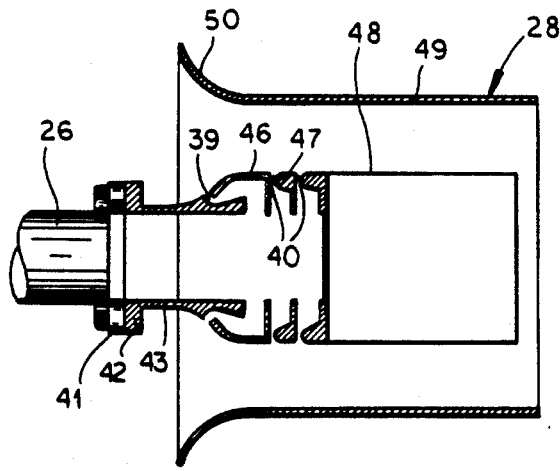
FIGS. 5 and 6 are axial sectional and end views of the ejector according to this invention.
Figure 6:
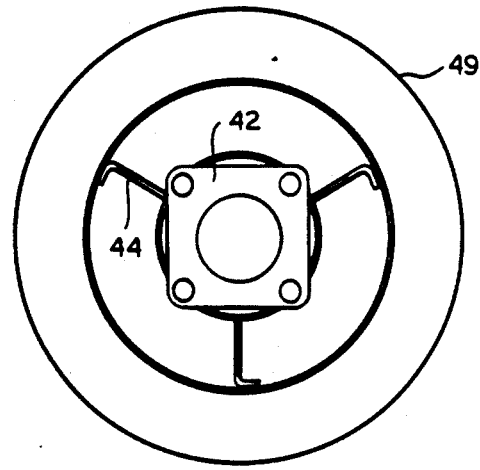

As seen in FIGS. 5 and 6 the conduit 26 is welded to a steel flange 41 bolted in turn to an integral aluminum flange 42 of an input pipe 43 that opens in the ejector 28 through an upstream primary nozzle gap 39 and through two downstream gaps 40. Struts 44 support this pipe 43 as well as rings 45, 46, and 47 and a tube 48 that define these gaps 39 and 40. The surrounding tube 49 has an outwardly flared upstream end 50. Other arrangements of diluters for smaller engines are also usual.

The gap 39 opens radially outward and slightly downstream in the tube 49 and the two other gaps 40 open mainly downstream and radially outward. This structure will therefore suck in considerable ambient air via the intake end 50, so that this air will mix with the expelled exhaust gases, diluting them and further reducing the explosion hazard. In fact, like a jet pump, such a device will entrain a much greater volume of air than the volume of exhaust gases employed. The displacement speed as well as the temperature will therefore also be greatly dropped at the ejector 28 to less than 60° C. when ambient temperature is below 35° C.

I claim:

1. An antiexplosion diesel engine system, comprising:
   a diesel engine having:
      a fresh-air intake,
      an exhaust-gas output, and
      a closed recirculating type cooling system having a pump driven by the engine by means of which a liquid coolant is circulated; and
   an antiexplosion arrangement for said engine, said antiexplosion arrangement including:
      an intake flame arrester located at said fresh-air intake and having an arrester housing and at least one plate therein formed with a multiplicity of parallel passages of very small cross section measuring at most 1.0 mm thereacross,
      a relatively long jacketed exhaust-pipe section connected to said exhaust-gas output and receiving exhaust gases therethrough from said engine, said cooling system being connected to said exhaust-pipe section for cooling exhaust gas traversing same by indirect heat exchange,
      an exhaust-gas tube-bundle-type heat exchanger connected to said exhaust-gas section, said cooling system being connected to said exhaust-pipe heat exchanger for cooling exhaust gas traversing same by indirect heat exchange, said heat exchanger having a housing separable into two parts,
      an output flame arrester connected to said exhaust-gas heat exchanger, said output flame arrester having an arrester housing and at least one plate therein formed with a multiplicity of parallel passages of very small cross section measuring at most 1.0 mm thereacross, both of said arrester housings being of substantially greater flow cross sections than respective inlets thereto and outlets therefrom,
      another relatively short exhaust-gas pipe section interposed between said heat exchanger and said inlet of said output flame arrester, and
      a venturi-type exhaust-gas diluter downstream of said output flame arrester for mixing ambient air with the exhaust gas cooled in said heat exchanger and passing through said output flame arrester, said diluter including a large-diameter outer tube centered upon an upstream-to-downstream axis and having upstream and downstream ends open to the atmosphere, and a nozzle-type core in the outer tube and forming a plurality of gaps opening radially outwardly and downstream in said outer tube.

* * * * *